Feb. 10, 1970  WOLF-DIETER KLINK  3,494,665
THREE-POINT SAFETY BELT

Filed Nov. 20, 1967  2 Sheets-Sheet 1

Feb. 10, 1970 WOLF-DIETER KLINK 3,494,665
THREE-POINT SAFETY BELT

Filed Nov. 20, 1967 2 Sheets-Sheet 2

United States Patent Office 3,494,665
Patented Feb. 10, 1970

3,494,665
THREE-POINT SAFETY BELT
Wolf-Dieter Klink, Staufenstrasse 8,
Lindach, near Schwabisch Gmund, Germany
Filed Nov. 20, 1967, Ser. No. 684,455
Claims priority, application Germany, Nov. 21, 1966,
K 56,089
Int. Cl. A62b 35/00; B60r 21/10
U.S. Cl. 297—389                                    5 Claims

ABSTRACT OF THE DISCLOSURE

Three-point safety belt for use with a seat as in a motor vehicle includes a shoulder belt and a lap belt, means at one end of each of the belts for anchoring the respective ends spaced from one another on one side laterally of the seat, and a buckle part member secured in common to both of the belts at a location of the belts spaced from the respective anchored ends thereof, the buckle part member having a pair of devices operative independently of one another for adjusting the length of the shoulder and lap belts respectively between the anchored ends thereof and the location thereof at which the belts are secured respectively to the common buckle part member.

---

My invention relates to a so-called three-point safety belt for use with a seat such as a seat in a motor vehicle, and which more particularly is formed of a shoulder belt and a lap belt, one of the ends or "points" of each of the belts being anchored spaced from one another or one side of the seat, and both belts being secured at a location thereof adjacent the other free ends thereof substantially at a third "point" to a common buckle part member.

It is an object of my invention to provide a three-point safety belt of the foregoing type which will permit mutually independent adjustment of the length of the shoulder belt and lap belt respectively between the anchored ends thereof and the location thereof at which the belts are secured to the common buckle part member.

With the foregoing and other objects in view, I provide in accordance with my invention a pair of devices carried by a buckle part member of the safety belt and operative independently of one another for adjusting the length of the shoulder and lap belts respectively between the anchored ends thereof and the location thereof at which the belts are secured respectively to the common buckle part member. The buckle part member can either be a part of the buckle lock or a part of the buckle slider receivable in the buckle lock according to the general type of construction known in the art of safety belts.

In accordance with further features of my invention, the devices for adjusting the length of the belts each comprises, respectively, a crosspiece mounted in the buckle part member and displaceable in the longitudinal direction of the respective belt, the buckle part member being formed with a slot for passage of the respective belt therethrough, the slot being defined by an edge of the buckle part member, and that edge forming with the crosspiece a means for clamping the respective belt under tension therebetween.

In accordance with other features of my invention, the devices for adjusting the length of the belts are disposed in tandem alignment with one another in the axial direction of the belts, or in other words, in the direction in which the belts are pulled through the buckle part member, the clamping edges of the slots through which the respective belts are pulled being disposed parallel to one another or inclined at an acute angle toward one another.

In accordance with additional features of my invention, the crosspieces are formed with end portions that are disposed substantially perpendicular to the main body portion thereof, and the buckle part member is formed with guide means comprising a channel having a substantially U-shaped cross section located at opposite lateral edges of the buckle part member, the end portions of the crosspieces being slidingly received in the guide channels. The inner width of the U-shaped channels corresponds substantially to the thickness of the end portions of the crosspieces.

Other features which are considered as characteristic for the invention are set forth in the appended claims.

Although the invention is illustrated and described herein as embodied in three-point safety belts, it is nevertheless not intended to be limited to the details shown, since various modifications and structural changes may be made therein without departing from the spirit of the invention and within the scope and range of equivalents of the claims.

The construction and method of operation of the invention, however, together with additonal objects and advantages thereof will be best understood from the following description of specific embodiments when read in connection with the accompanying drawings, in which.

Figure 1:
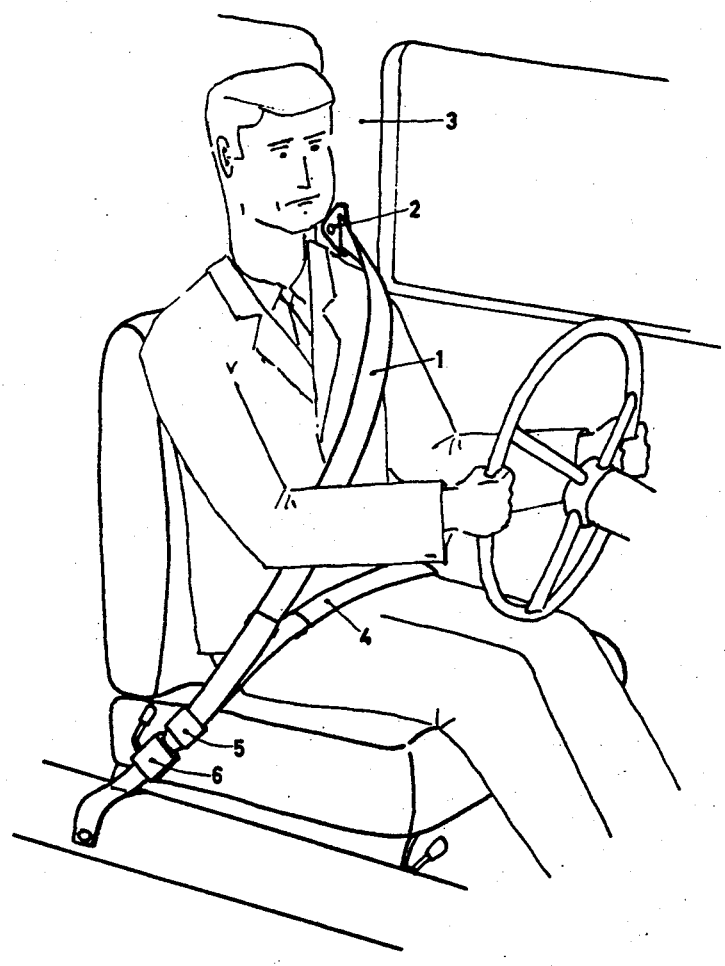
FIG. 1 is a perspective view of part of the interior of a motor vehicle showing an occupant thereof harnessed by the three-point safety belt of my invention.
Figure 2:
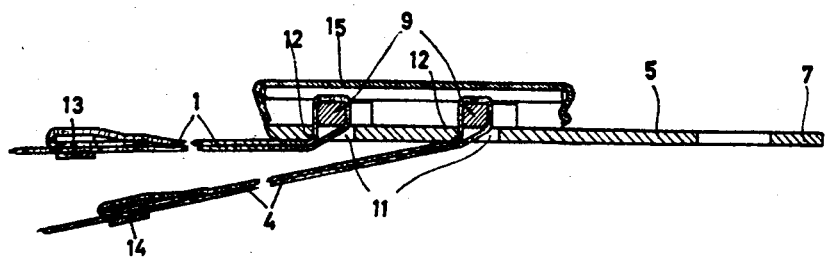
FIG. 2 is a longitudinal sectional view of a buckle part member constructed in the form of a buckle slider.
Figure 3:
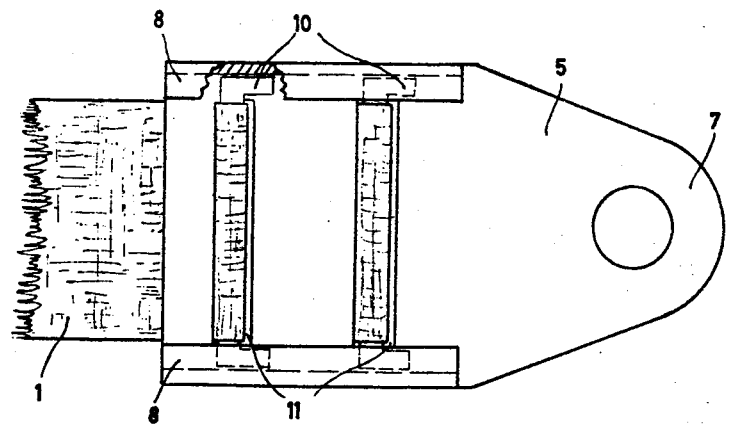
FIG. 3 is a top plan view of FIG. 2 partly broken away and with the protective cap 15 removed.

Referring now to the drawing, there is shown in FIG. 1 a three-point safety belt in accordance with my invention which includes a shoulder belt 1 extending across the chest of an occupant of a motor vehicle, one end 2 of the shoulder belt 1 being secured to a door post 3 in the illustrated embodiment. Also shown in FIG. 1 is a lap belt 4 which is anchored on the same side as the end 2 of the shoulder belt 1 to the floor of the vehicle or to another suitable location on the vehicle (not shown) which is spaced from the location at which the end 2 is secured. A buckle part 5 in the form of a buckle slider is secured in common to the free end portions of the belts 1 and 4 at locations thereof spaced from the ends of the belts that are fixed to the door post and floor, or the like, respectively, of the motor vehicle. The slider 5 cooperates with a belt buckle lock 6 rigidly fixed to the raised tunnel of the motor vehicle, for example. Of course, if the vehicle is of the rear-drive type and does not have a tunnel, the buckle lock can be fixed to a flat part of the vehicle floor in any suitable manner. The buckle slider 5 is provided with a tongue portion 7 as shown in FIGS. 2 and 3 which is receivable in the buckle lock 6 and which is in the form of a plate having opposite lateral edge portions 8 extending in the longitudinal direction of the slider 5 which form a guiding channel of substantially U-shaped cross section respectively for a pair of crosspieces 9. The crosspieces 9 have end portions 10 which are disposed substantially perpendicularly thereto and which are located within the respective U-shaped guiding channels of the slider 5. In the embodiment of FIG. 2, a pair of slots 11 are formed in the slider plate 5, disposed parallel to the crosspieces 9 and to one another. An edge 12 of the slider plate 5 defining the respective slots 11 cooperate with the respective crosspieces 9 so as to clamp therebetween the respective belts 1 and 4 which pass through the slots 11 and encircle the respective crosspieces 9. The free end portions of the belts 1 and 4, which are doubled-back on the effective length of the respective belts, are secured thereto i.e. to the portion of the belts respectively located between the fixed ends thereof and the location at which they are clamped within the buckle slider 5, by means of longitudinally displaceable straps or clips 13 and 14, respectively.

The effective length of the belts 1 and 4 can be readily varied manually by pulling on either one or the other portion of the respective belts extending from each of the slots 11 when the belt is under tension. When lengthening the effective length of the belt, it is advisable to initially displace the strap 13 or 14 respectively in direction toward the slider 5. When shortening the effective length of the respective belt, the appropriate strap 13 or 14, after adjusting to the desired length of the belt, is slid away a distance from the slider 5 along the respective belt until the end portion of the respective belt lies doubled-back flat on the effective length of the respective belt.

In order to cover the space within which the crosspieces 9 are received, the buckle part member 5 is preferably provided with a snap-on protective cap 15. As shown in FIG. 2, the righthand side of the cap 15 has a yieldable springy edge which permits the cap 15 to be snapped onto the U-shaped channel portions 8.

Of course, the buckle part member 5 can also, in accordance with the invention of this application, be part of a buckle lock rather than of the buckle slider as illustrated, or can in fact also be formed of a part which is independent of the buckle lock and which can be hooked or suitably attached, for example, to the buckle lock.

An advantage of the aforedescribed structure of the devices for adjusting the length of the belts is that the effective lengths of the respective belts are able to be varied and adjusted to prevailing conditions by using only one hand to pull on one or the other portion of the respective belt surrounding the respective crosspiece and extending from the corresponding slot formed in the buckle part member.

I claim:

1. Three-point safety belt for use with a seat as in a motor vehicle, comprising a shoulder belt and a lap belt, means at one end of each of said belts for anchoring said ends respectively spaced from one another on one side laterally of the seat and a buckle part member secured in common to both of said belts at a location of said belts spaced from the respective anchored ends thereof, said buckle part member having a pair of devices operative independently of one another for adjusting the length of said shoulder and said lap belts respectively between said anchored ends thereof and said location thereof at which said belts are secured respectively to said common buckle part member, said devices for adjusting the length of said belts being disposed in tandem alignment in the axial direction of said belts and comprising a pair of crosspieces mounted in said buckle part member and displaceable relative to one another in the longitudinal direction of the respective belts, said buckle part member being formed with a pair of slots for passage of the repective belts therethrough, said slots being defined by edges of said buckle part member, and said edges forming with the respective crosspieces separate means for clamping the respective belts under tension therebetween and independently of one another.

2. Three-point safety belt according to claim 1 wherein the clamping edges of said slots are disposed on said buckle part member transversely to the longitudinal direction of said belts.

3. Three-point safety belt according to claim 2 wherein said slots are parallel to one another.

4. Three-point safety belt according to claim 1 wherein said crosspieces are formed with end portions disposed substantially perpendicularly to the main body portion thereof, said buckle part member being formed with guide means comprising a channel having a substantially U-shaped cross section located at opposite lateral edges of said buckle part member, said end portions of said crosspieces being slidingly received in said guide channels, said end portions having a thickness corresponding substantially to the inner width of said U-shaped channels.

5. Three-point safety belt according to claim 1 wherein said buckle part member is part of a buckle slider.

References Cited

UNITED STATES PATENTS

| | | | |
|---|---|---|---|
| 3,206,816 | 9/1965 | Vilcins et al. | 24—74 |
| 3,258,293 | 6/1966 | Sharp | 297—389 |
| 3,317,243 | 5/1967 | Weman et al. | 297—389 |
| 3,336,369 | 8/1967 | Rutty et al. | 24—74 |
| 3,377,667 | 4/1968 | Alofs | 24—77 |

JAMES T. McCALL, Primary Examiner

U.S. Cl. X.R.

24—230.1